(12) United States Patent
Hashiguchi et al.

(10) Patent No.: US 9,490,638 B2
(45) Date of Patent: Nov. 8, 2016

(54) ELECTRICAL POWER TRANSMISSION SYSTEM AND ELECTRICAL POWER OUTPUT DEVICE

(75) Inventors: Takaaki Hashiguchi, Tokyo (JP); Hirotsugu Wada, Kanagawa (JP); Kenichi Fujimaki, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 886 days.

(21) Appl. No.: 13/255,589

(22) PCT Filed: Mar. 10, 2010

(86) PCT No.: PCT/JP2010/053982
§ 371 (c)(1),
(2), (4) Date: Sep. 9, 2011

(87) PCT Pub. No.: WO2010/106948
PCT Pub. Date: Sep. 23, 2010

(65) Prior Publication Data
US 2011/0316349 A1 Dec. 29, 2011

(30) Foreign Application Priority Data
Mar. 17, 2009 (JP) .................................. 2009-063748

(51) Int. Cl.
*H02J 17/00* (2006.01)
*H02J 5/00* (2016.01)
(Continued)

(52) U.S. Cl.
CPC ............. *H02J 5/005* (2013.01); *H04B 5/0037* (2013.01); *H04B 5/0093* (2013.01); *H01F 2038/143* (2013.01)

(58) Field of Classification Search
CPC ... H02J 5/005; H04B 5/0037; H04B 5/0093; H01F 2038/143

USPC ......................................................... 307/104
See application file for complete search history.

(56) References Cited

U.S. PATENT DOCUMENTS

| 8,378,523 B2 * | 2/2013 | Cook et al. ................... 307/104 |
| 2001/0012208 A1 * | 8/2001 | Boys ............................... 363/23 |

(Continued)

FOREIGN PATENT DOCUMENTS

| JP | 11-032452 | 2/1999 |
| JP | 2006-217393 | 8/2006 |

(Continued)

OTHER PUBLICATIONS

Japanese Office Action for related JP Application No. 2009-063748 dated Apr. 30, 2013.

(Continued)

*Primary Examiner* — Jared Fureman
*Assistant Examiner* — Joel Barnett
(74) *Attorney, Agent, or Firm* — Dentons US LLP

(57) ABSTRACT

A power transmission system having a first resonant element with a resonant frequency, a signal generator that generates an electrical power signal with a predetermined frequency that is the same as the resonant frequency of the first resonator, and a driven element that supplies the electrical power signal to the first resonator via magnetic field resonance coupling. A second resonator having a resonant frequency approximately the same as that of the first resonator can be positioned to receive the power from the first resonator. A magnetic coupling circuit can be magnetic field resonance couple to the first and second resonators for transferring the electrical power signal between them.

9 Claims, 12 Drawing Sheets

(51) Int. Cl.
*H04B 5/00* (2006.01)
*H01F 38/14* (2006.01)

(56) References Cited

U.S. PATENT DOCUMENTS

| | | | |
|---|---|---|---|
| 2007/0222542 A1 | 9/2007 | Joannopoulos et al. | |
| 2009/0015075 A1* | 1/2009 | Cook et al. | 307/149 |
| 2009/0033280 A1* | 2/2009 | Choi et al. | 320/108 |
| 2009/0058189 A1* | 3/2009 | Cook | H04B 5/0037 307/104 |
| 2009/0102292 A1* | 4/2009 | Cook et al. | 307/104 |
| 2009/0127937 A1* | 5/2009 | Widmer et al. | 307/149 |
| 2009/0212636 A1* | 8/2009 | Cook | G06F 1/26 713/300 |
| 2009/0230777 A1* | 9/2009 | Baarman et al. | 307/104 |
| 2009/0243397 A1* | 10/2009 | Cook et al. | 307/104 |
| 2009/0264069 A1 | 10/2009 | Yamasuge | |
| 2009/0286470 A1* | 11/2009 | Mohammadian et al. | 455/7 |
| 2010/0033021 A1* | 2/2010 | Bennett | 307/104 |
| 2010/0038970 A1* | 2/2010 | Cook | H02J 5/005 307/104 |
| 2010/0201201 A1* | 8/2010 | Mobarhan et al. | 307/104 |
| 2010/0201204 A1* | 8/2010 | Sakoda et al. | 307/104 |
| 2010/0314946 A1* | 12/2010 | Budde et al. | 307/104 |
| 2012/0256585 A1* | 10/2012 | Partovi et al. | 320/108 |

FOREIGN PATENT DOCUMENTS

| | | |
|---|---|---|
| JP | 2009-501510 | 1/2009 |
| JP | 2009-261157 | 11/2009 |
| JP | 2010-158114 | 7/2010 |
| JP | 2010-537496 | 12/2010 |
| JP | 2011-514781 | 5/2011 |
| WO | 2007/008646 | 1/2007 |
| WO | 2009023646 | 2/2009 |
| WO | 2009111597 | 9/2009 |
| WO | 2010106636 | 9/2010 |

OTHER PUBLICATIONS

International Search Report Dated Mar. 17, 2009.

* cited by examiner

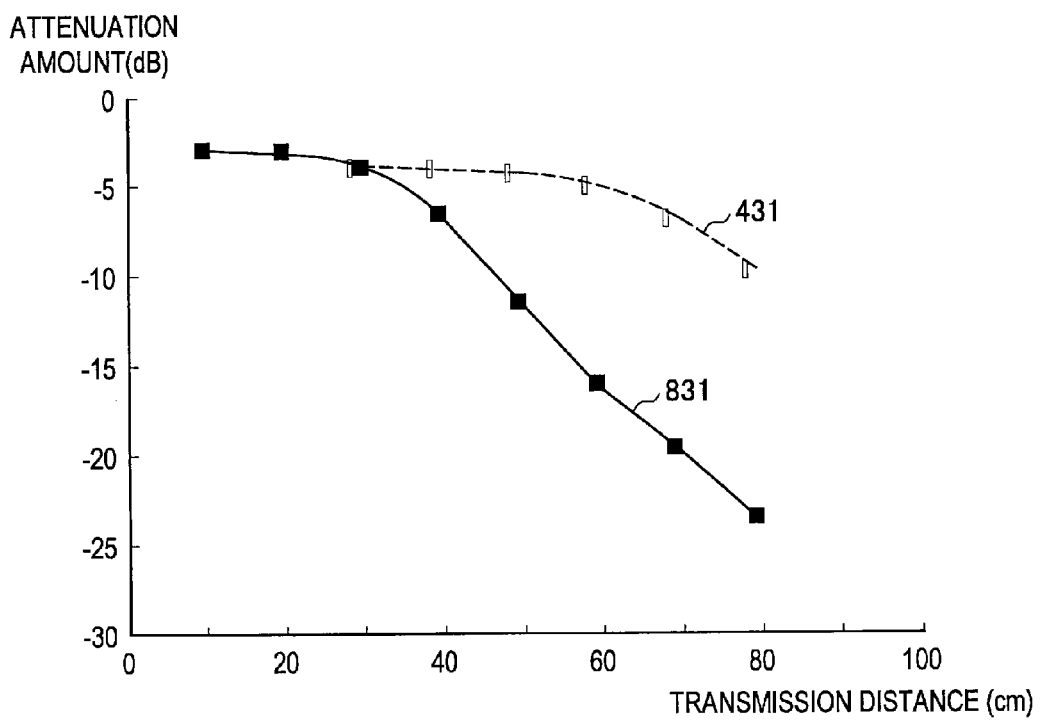
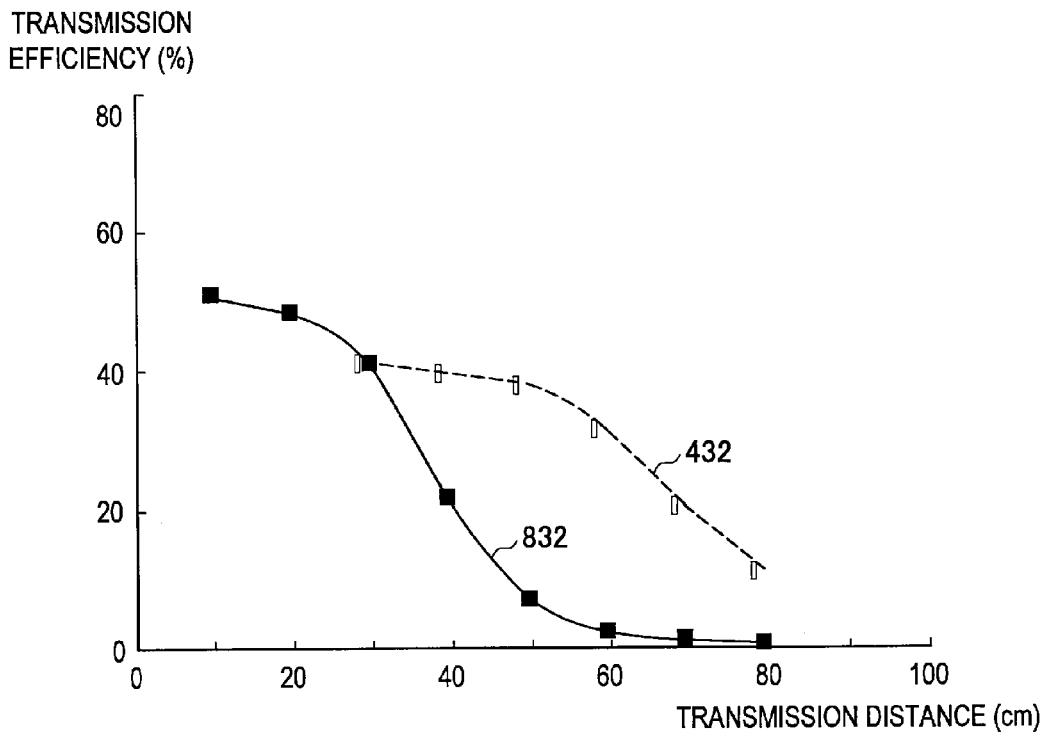

ELECTRICAL POWER TRANSMISSION SYSTEM AND ELECTRICAL POWER OUTPUT DEVICE

TECHNICAL FIELD

The present invention relates to an electrical power transmission system and an electrical power output device, and more particularly, to an electrical power transmission system and an electrical power output device which supply electrical power using magnetic field resonance.

BACKGROUND ART

In the past, a technique using electromagnetic induction has been widely used as a wireless electrical power transmission technique. In recent years, an electrical power transmission technique using resonance of an electric field or a magnetic field has attracted attention. For example, an electrical power transmission system using a resonance phenomenon of a magnetic field generated by a resonant element including a coil and a capacitor has been suggested (for example, see Patent Literature).

CITATION LIST

Patent Literature

Patent Literature 1: U.S. Patent Publication No. 2007/0222542 (FIG. 3)

SUMMARY OF INVENTION

Technical Problem

In the conventional technique, electrical power can be transmitted by coupling by magnetic field resonance between a resonant element installed in a power supply device that supplies electrical power and a resonant element installed in a power receiving device that receives electrical power supplied from the power supply device. However, in an electrical power transmission system using the magnetic field resonance, as the distance between the resonant elements increases, transmission efficiency of electrical power is lowered.

The present invention is made in light of the above problems, and it is an object of the present invention to provide an electrical power transmission system and an electrical power output device in which transmission efficiency of electrical power is improved.

Solution to Problem

According to a first aspect of the present invention in order to achieve the above-mentioned object, there is provided an electrical power transmission system including: a power supply device that includes a first resonant element having inductance and capacitance, and a frequency generator that generates electrical power of an electrical signal having approximately the same frequency component as a resonant frequency decided by the inductance and the capacitance and supplies the generated electrical signal to the first resonant element; a magnetic field coupling circuit that becomes coupled by magnetic field resonance with the first resonant element; and a power receiving device that includes a second resonant element that receives electrical power from the power supply device by magnetic field resonance with the magnetic field coupling circuit. Thus, there is an effect of transmitting electrical power from the power supply device to the power receiving device by coupling by magnetic field resonance between the magnetic field coupling circuit that causes magnetic field coupling with the first resonant element and the second resonant element.

In the first aspect, the magnetic field coupling circuit may have approximately the same resonant frequency as the resonant frequency decided by the inductance and the capacitance of the first resonant element. Thus, there is an effect of increasing a degree of coupling between the first resonant element and the magnetic field coupling circuit by setting the magnetic field coupling circuit to approximately the same resonant frequency as the resonant frequency of the first resonant element.

In the first aspect, the magnetic field coupling circuit may generate a magnetic field on approximately the same line as magnetic field directions of magnetic fields generated by the first and second resonant elements. Thus, there is an effect of generating a magnetic field on approximately the same line as the magnetic field directions of the magnetic fields generated by the first and second resonant elements.

In the first aspect, the magnetic field coupling circuit may generate a magnetic field approximately in parallel to magnetic field directions of magnetic fields generated by the first and second resonant elements. Thus, there is an effect of generating a magnetic field approximately in parallel to the magnetic field directions of the magnetic fields generated by the first and second resonant elements.

In the first aspect, the magnetic field coupling circuit may be positioned at a midpoint of a distance between the first and second resonant elements. Thus, there is an effect of increasing a degree of coupling between the magnetic field coupling circuit and the second resonant element by arranging the magnetic field coupling circuit around at the midpoint of the distance between the first and second resonant elements.

In the first aspect, the magnetic field coupling circuit may include a plurality of resonant elements having inductance and capacitance. Thus, there is an effect of disposing the plurality of resonant elements having inductance and capacitance in the magnetic field coupling circuit.

In the first aspect, the power receiving device may receive electrical power from the power supply device by magnetic field resonance with the first resonant element or the magnetic field coupling circuit. Thus, there is an effect of having the power receiving device to receive electrical power from the power supply device by magnetic field resonance between at least one of the first resonant element and the magnetic field coupling circuit and the second resonant element.

According to a second aspect of the present invention in order to achieve the above-mentioned object, there is provided an electrical power output device including: a resonant element having inductance and capacitance; a frequency generator that generates electrical power of an electrical signal having approximately the same frequency component as a resonant frequency decided by the inductance and the capacitance and supplies the generated electrical signal to the resonant element; and a plurality of resonant elements having approximately the same resonant frequency as the resonant frequency of the resonant element. Thus, there is an effect of causing a coupling state by magnetic field resonance between the resonant element that supplies the electrical signal from the frequency generator and the plurality of resonant elements.

Advantageous Effects of Invention

According to the present invention, an excellent effect capable of improving transmission efficiency of electrical power in an electrical power transmission system and an electrical power output device can be obtained.

BRIEF DESCRIPTION OF DRAWINGS

FIGS. 5A and 5B are diagrams illustrating a relationship between the transmission distance between the resonant elements 130 and 330 and transmission efficiency.

DESCRIPTION OF EMBODIMENTS

Hereinafter, preferred embodiments of the present invention will be described in detail with reference to the appended drawings. Note that, in this specification and the drawings, elements that have substantially the same function and structure are denoted with the same reference signs, and repeated explanation is omitted.

1. First Embodiment (Electrical Power Supply Technique: Example in which Resonant Element and Magnetic Field Coupling Circuit are Arranged so that Coils are on Same Axial Line)

2. Second Embodiment (Electrical Power Supply Technique: Example in which Resonant Element and Magnetic Field Coupling Circuit are Arranged so that Axes of Coils are Parallel to Each Other)

3. Third Embodiment (Electrical Power Supply Technique: Example in which Magnetic Field Coupling Circuit is Arranged around Resonant Element)

4. Application Example of First to Third Embodiment

1. First Embodiment

Configuration Example of Electrical Power Transmission System

Figure 1:
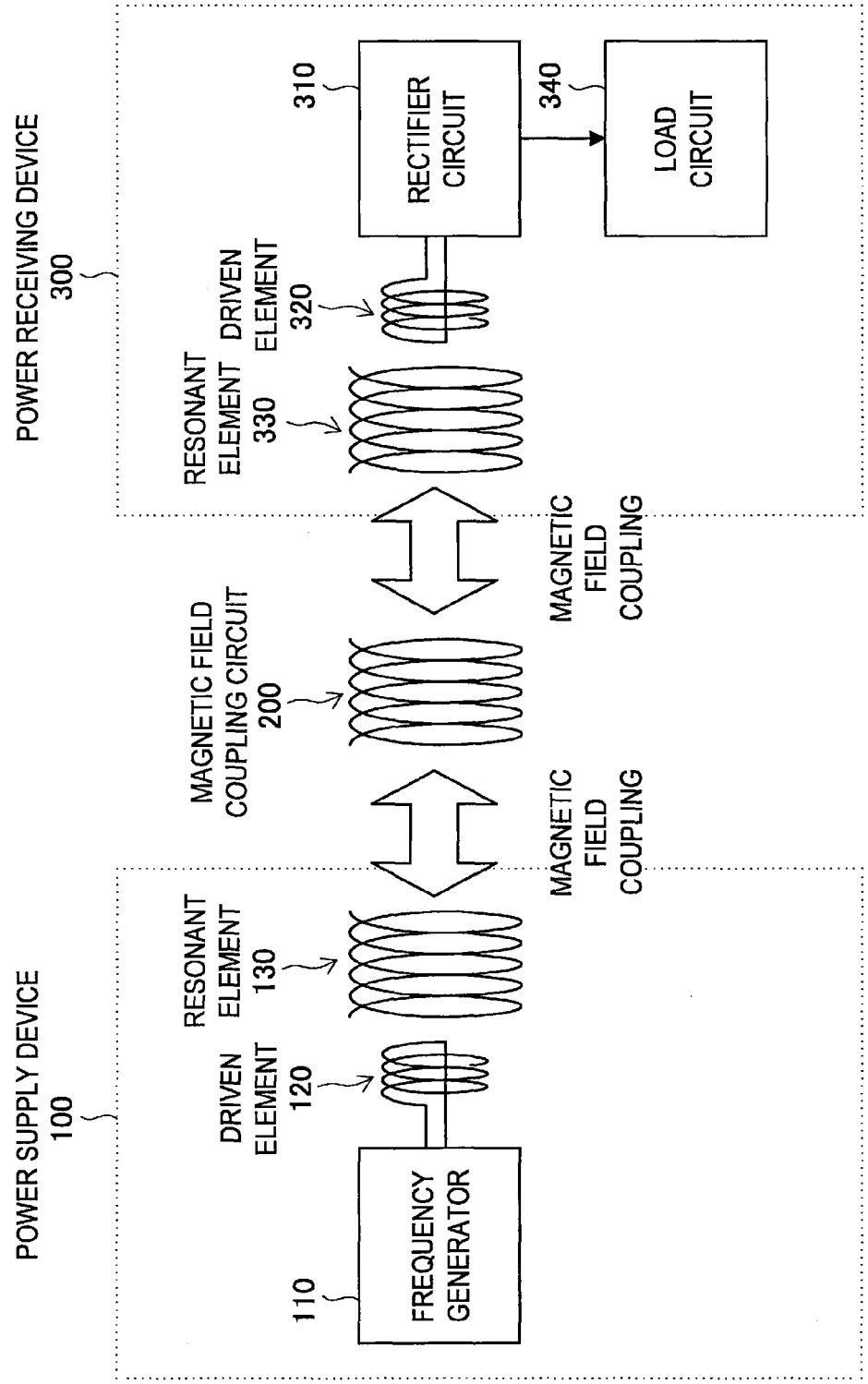
FIG. 1 is a block diagram illustrating a configuration example of an electrical power transmission system according to a first embodiment of the present invention.

FIG. 1 is a block diagram illustrating a configuration example of an electrical power transmission system according to a first embodiment of the present invention. The electrical power transmission system includes a power supply device 100, a magnetic field coupling circuit 200, and a power receiving device 300. The power supply device 100 supplies the power receiving device 300 with electrical power using coupling by magnetic field resonance. The magnetic field coupling circuit 200 is a circuit that transmits electrical power supplied from the power supply device 100 to the power receiving device 300. The power receiving device 300 receives electrical power from the power supply device 100 via the magnetic field coupling circuit 200 and performs a certain operation.

The power supply device 100 includes a frequency generator 110, a driven element 120, and a resonant element 130. The power supply device 100 is an example of a power supply device specified in the scope of claims. The power receiving device 300 includes a rectifier circuit 310, a driven element 320, a resonant element 330, and a load circuit 340. The power receiving device 300 is an example of a power receiving device specified in the scope of claims.

The frequency generator 110 generates an electrical signal including a predetermined frequency component. For example, the frequency generator 110 generates an electrical signal including the same frequency component as a resonant frequency of the resonant element 130. That is, the frequency generator 110 generates an electrical signal as electrical power to be supplied to the power receiving device 300. For example, the frequency generator 110 is implemented by a Colpitts oscillator, a Hartley oscillator, or the like. The frequency generator 110 outputs electrical power of the generated electrical signal to the driven element 120.

Here, an example in which the frequency generator 110 generates an electrical signal including the same frequency component as the resonant frequency of the resonant element 130 has been described, but the present invention is not limited thereto. For example, the frequency generator 110 may generate an electrical signal including approximately the same frequency component as the resonant frequency of the resonant element 130 or may generate an electrical signal including a plurality of frequency components near the resonant frequency. The frequency generator 110 is an example of a frequency generator specified in the scope of claims.

The driven element 120 is a dielectric element that is excited by the electrical signal supplied from the frequency generator 110 and transmits the electrical signal to the resonant element 130. That is, the driven element 120 couples the frequency generator 110 with the resonant element 130 by an electromagnetic induction effect. The driven element 120 functions to prevent an electrical signal from being reflected by performing impedance matching between the frequency generator 110 and the resonant element 130. For example, the driven element 120 is implemented by a coil. The driven element 120 outputs the electrical signal supplied from the frequency generator 110 to the resonant element 130 by an electromagnetic induction effect.

The resonant element 130 is a circuit that mainly generates a magnetic field based on the electrical signal output from the driven element 120. The resonant element 130 has inductance and capacitance. The resonant element 130 is strongest in magnetic field strength at the resonant frequency. The resonant frequency fr may be represented by the following equation:

$$fr = \frac{1}{2\pi\sqrt{L \cdot C}},\quad [\text{Math. 1}]$$

where L represents inductance of the resonant element 130, and C represents capacitance of the resonant element 130. In view of the above equation, the resonant frequency of the resonant element 130 is decided depending on the inductance L and the capacitance C of the resonant element.

For example, the resonant element 130 is implemented by a coil. In this implementation example, capacitance between coil lines functions as capacitance. In this example, the coil of the resonant element 130 generates the magnetic field in an axial direction of the coil. The resonant element 130 is an example of a first resonant element or an example of a resonant element of an electrical power output device, which is specified in the scope of claims.

The magnetic field coupling circuit 200 couples the corresponding magnetic field coupling circuit 200 with the resonant element 130 of the power supply device 100 by magnetic field resonance. That is, the magnetic field coupling circuit 200 becomes coupled with the resonant element 130. The magnetic field coupling circuit 200 causes magnetic field coupling even between the corresponding magnetic field coupling circuit 200 and the power receiving device 300. Similarly to the resonant element 130, the magnetic field coupling circuit 200 has inductance and capacitance. The magnetic field coupling circuit 200 has approximately the same resonant frequency as the resonant element 130. For example, in order to optimize a degree of coupling with the resonant element 130, the magnetic field coupling circuit 200 is set to the same resonant frequency as the resonant element 130. The magnetic field coupling circuit 200 is arranged between the resonant element 130 of the power supply device 100 and the resonant element 330 of the power receiving device 300.

For example, similarly to the resonant element 130, the magnetic field coupling circuit 200 is implemented by a coil. In this implementation example, capacitance between coil lines functions as capacitance. The coil of the resonant element 130 generates the magnetic field in an axial direction of the coil. The magnetic field coupling circuit 200 transmits electrical power supplied from the power supply device 100 to the resonant element 330 by coupling by magnetic field resonance between the magnetic field coupling circuit 200 and the resonant element 330 of the power receiving device 300. The magnetic field coupling circuit 200 is an example of a magnetic field coupling circuit specified in the scope of claims.

The resonant element 330 is a device receiving electrical power from the power supply device 100 according to magnetic field coupling by magnetic field resonance between the corresponding resonant element 330 and the magnetic field coupling circuit 200. The resonant element 330 receives electrical power from the power supply device 100 by magnetic field coupling between the corresponding resonant element 330 and the resonant element 130 of the power supply device 100. Similarly to the resonant element 130 and the magnetic field coupling circuit 200, the resonant element 330 has inductance and capacitance.

The resonant element 330 has approximately the same resonant frequency as the resonant element 130 or the magnetic field coupling circuit 200. For example, in order to optimize a degree of coupling with the magnetic field coupling circuit 200, the resonant element 330 is set to the same resonant frequency as the resonant frequency of the magnetic field coupling circuit 200. As described above, the resonant frequencies of the resonant element 130, the magnetic field coupling circuit 200 and the resonant element 330 are set to the same frequency. Thus, efficiency of electrical power transmission from the power supply device 100 to the power receiving device 300 can be improved.

For example, similarly to the resonant element 130 and the magnetic field coupling circuit 200, the resonant element 330 is implemented by a coil. In this implementation example, capacitance between coil lines functions as capacitance. In this example, the coil of the resonant element 330 generates the magnetic field in an axial direction of the coil. The resonant element 330 outputs electrical power of an electrical signal generated by magnetic field coupling with the resonant element 130 to the driven element 320. The resonant element 330 is an example of a second resonant element specified in the scope of claims.

The driven element 320 is a dielectric element that is excited by the electrical signal supplied from the resonant element 330 and outputs the electrical signal to the rectifier circuit 310. That is, the driven element 320 couples the resonant element 130 with the rectifier circuit 310 by an electromagnetic induction effect. The driven element 320 functions to prevent an electrical signal from being reflected by performing impedance matching between the resonant element 330 and the rectifier circuit 310. For example, the driven element 320 is implemented by a coil. The driven element 320 supplies the rectifier circuit 310 with an alternating current (AC) voltage which is the electrical signal generated by an electromagnetic induction effect with the resonant element 330.

The rectifier circuit 310 rectifies the AC voltage supplied from the driven element 320 and generates a direct current (DC) voltage as a power voltage. The rectifier circuit 310 supplies the load circuit 340 with the generated power voltage. The load circuit 340 receives the power voltage from the rectifier circuit 310 and performs a certain operation.

As described above, by installing the magnetic field coupling circuit 200 between the resonant elements 130 and 330, coupling occurs by magnetic field resonance between the resonant elements 130 and 330 and the magnetic field coupling circuit 200, and so electrical power from the power supply device 100 can be supplied to the power receiving device 300. A change in electrical power transmission efficiency by an arrangement of the magnetic field coupling circuit 200 will be described below with the accompanying drawings.

[Example of Measurement Result of Electrical Power Efficiency when Magnetic Field Coupling Circuit is Rotated]

Figure 2A:
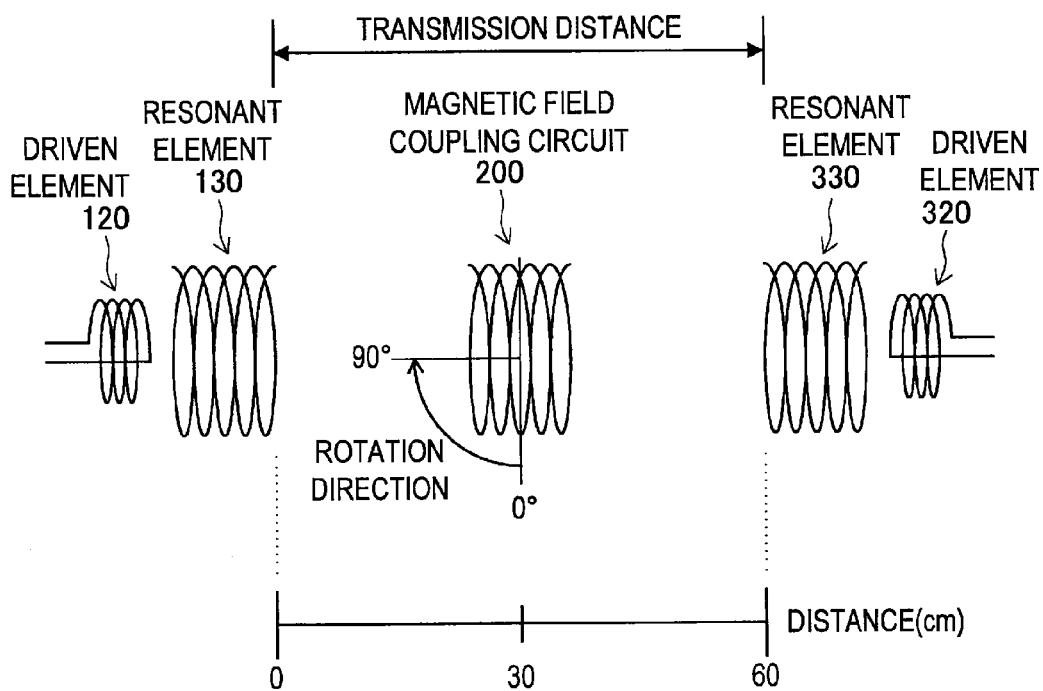
FIGS. 2A and 2B are diagrams illustrating an example of a result of measuring transmission efficiency of electrical power when a magnetic field coupling circuit 200 arranged in the middle of a transmission distance between resonant elements 130 and 330 is rotated.
Figure 2B:
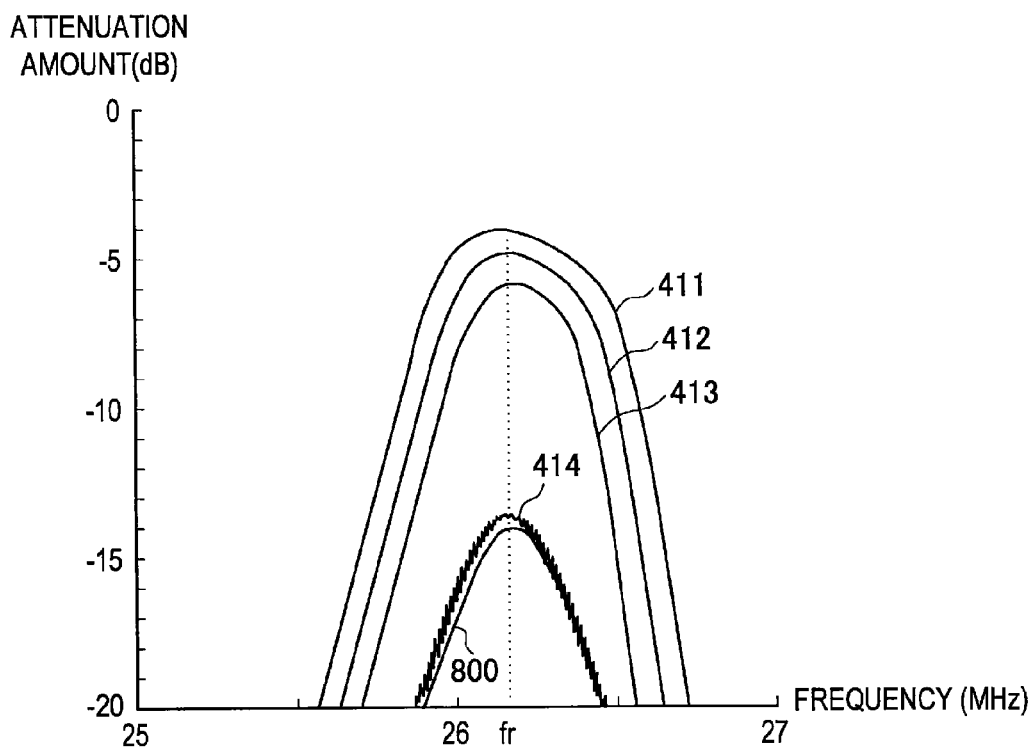

FIGS. 2A and 2B are diagrams illustrating an example of a result of measuring transmission efficiency of electrical power when the magnetic field coupling circuit 200 arranged in the middle of the transmission distance between the resonant elements 130 and 330 is rotated. FIG. 2A is a conceptual diagram illustrating a measurement system of transmission efficiency when the magnetic field coupling circuit 200 is rotated. FIG. 2B is a diagram illustrating transmission characteristics measured by the measurement system illustrated in FIG. 2A.

FIG. 2A illustrates the driven elements 120 and 320, the resonant elements 130 and 330, and the magnetic field coupling circuit 200. In this measurement system, an electrical signal applied from the frequency generator 110 to the driven element 120 is supplied to the resonant element 130 by an electromagnetic induction effect. Then, the electrical signal transmitted to the resonant element 330 via the magnetic field coupling circuit 200 by magnetic field resonance with the resonant element 130 is output to the driven element 320.

In this case, as the resonant element 130, the magnetic field coupling circuit 200, and the resonant element 330, the same coils having the radius of "10 cm" are used. The resonant element 130, the magnetic field coupling circuit 200, and the resonant element 330 have a resonant frequency of about 26.2 MHz. The coils of the resonant elements 130 and 330 are arranged on the same axial line of the coils. The transmission distance between the resonant element 130 and 330 is "60 cm." The magnetic field coupling circuit 200 is arranged at the midpoint of the transmission distance between the resonant element 130 and the resonant element 330. That is, the magnetic field coupling circuit 200 is arranged at the position of "30 cm" from the resonant element 130.

In this measurement system, on the basis of the coil of the magnetic field coupling circuit 200 arranged on the same axial line as the coils of the resonant elements 130 and 130, the magnetic field coupling circuit 200 is rotated by 0°, 45°, 60°, and 90° on the midpoint of the transmission distance. In this case, the measurement results are illustrated in FIG. 2B.

FIG. 2B illustrates transmission characteristics 411 to 414 and 800 between the resonant element 130 and the resonant element 330. A vertical axis represents an attenuation amount of electrical power in electrical power transmission between the driven elements 120 and 320, and a horizontal axis represents a frequency. The attenuation amount is based on electrical power of the electrical signal supplied from the frequency generator 110 to the driven element 120.

The transmission characteristics 411 to 414 are transmission characteristics measured by the measurement system illustrated in FIG. 2A. The transmission characteristics 411 to 414 show single-peaked characteristics peaked at the resonant frequency fr. The transmission characteristic 411 is a transmission characteristic between the resonant element 130 and the resonant element 330 when the angle of the magnetic field coupling circuit 200 is 0°. In this case, compared to the transmission characteristics 412 to 414, the transmission characteristic 411 is smallest in attenuation amount on the resonant frequency fr.

The transmission characteristic 412 is a transmission characteristic when the angle of the magnetic field coupling circuit 200 is 45°. The transmission characteristic 412 is 1 dB larger in attenuation amount of electrical power than the transmission characteristic 411. The transmission characteristic 413 is a transmission characteristic when the angle of the magnetic field coupling circuit 200 is 60°. The transmission characteristic 413 is 1 dB larger in attenuation amount of electrical power than the transmission characteristic 412. As described above, even if the angle of the magnetic field coupling circuit 200 becomes 60°, the attenuation amount increases by 2 dB compared to the case of 0°. Thus, even if the angle of the magnetic field coupling circuit 200 is not precisely adjusted, transmission efficiency can be improved to some extent.

The transmission characteristic 414 is a transmission characteristic when the angle of the magnetic field coupling circuit 200 is 90°. The transmission characteristic 414 is extremely larger in attenuation amount than the transmission characteristic 413. The transmission characteristic 414 shows approximately the same characteristic as the transmission characteristic 800.

The transmission characteristic 800 is a transmission characteristic when the magnetic field coupling circuit 200 is not installed between the resonant element 130 and the resonant element 330. As described above, the transmission characteristic 800 represents the same transmission characteristic as the transmission characteristic 414. For this reason, when the angle of the magnetic field coupling circuit 200 is a right angle, power transmission efficiency is hardly improved by the magnetic field coupling circuit 200.

As described above, except for the transmission characteristic 411 when the magnetic field coupling circuit 200 is arranged at 90°, by installing the magnetic field coupling circuit 200, the attenuation amount in the transmission characteristic can be reduced compared to the transmission characteristic 800 when the magnetic field coupling circuit 200 is not installed. Particularly, by coaxially installing the coils of the resonant elements 130 and 330, the transmission characteristic can be most improved. That is, by aligning a magnetic field direction of a magnetic field generated from the magnetic field coupling circuit 200 to be coaxial with magnetic field directions of magnetic fields generated from the resonant elements 130 and 330, the transmission efficiency between the resonant elements 130 and 330 can be improved. Further, the transmission efficiency can be improved to some extent without precisely adjusting the angle of the magnetic field coupling circuit 200.

Next, a description will be made with reference to the accompanying drawings in connection with a change in electrical power transmission efficiency when the magnetic field coupling circuit 200 moves on the same axial line after the axis of the coil of the magnetic field coupling circuit 200 is aligned on the same axial line as the coil of the resonant elements 130 and 330.

[Example of Measurement Result of Transmission Efficiency when Magnetic Field Coupling Circuit Moves on Same Axial Line]

Figure 3:
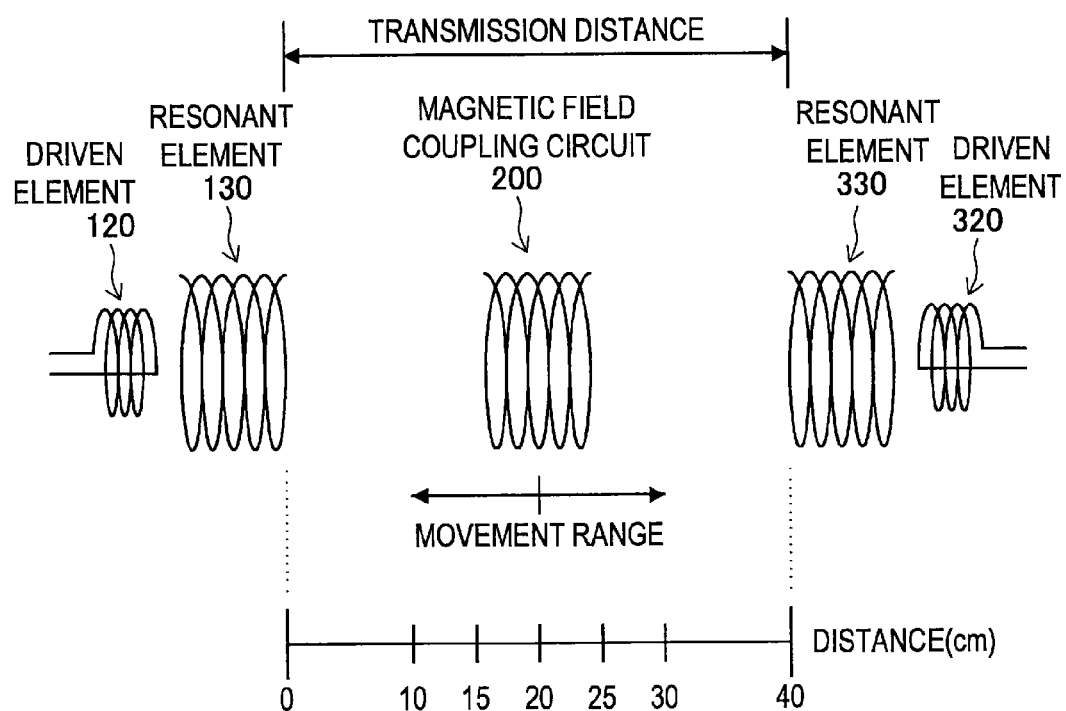
FIG. 3 is a conceptual diagram illustrating a measurement system of transmission efficiency when the magnetic field coupling circuit 200 moves on the same axial line between the resonant elements 130 and 330 according to the first embodiment of the present invention.

FIG. 3 is a conceptual diagram illustrating a measurement system of transmission efficiency when the magnetic field coupling circuit 200 moves on the same axial line between the resonant elements 130 and 330 according to the first embodiment of the present invention. Here, the driven elements 120 and 320, the resonant elements 130 and 330, and the magnetic field coupling circuit 200 are illustrated. The driven elements 120 and 320, the resonant elements 130 and 330, and the magnetic field coupling circuit 200 are the same as ones illustrated in FIG. 2A, and thus a description thereof will be omitted. However, the transmission distance between the resonant elements 130 and 330 is "40 cm," unlike FIG. 2A.

In this measurement system, the magnetic field coupling circuit 200 moves between the resonant elements 130 and 330. Then, when the distance between the resonant element 130 and the magnetic field coupling circuit 200 becomes "10 cm," "15 cm," "20 cm," "25 cm," and "30 cm," a transmission characteristic between the resonant elements 130 and 330 is measured. At this time, the coil of the magnetic field coupling circuit 200 is set to be coaxial with the coils of the resonant elements 130 and 330. The measurement results in this case are illustrated in the next drawing.

Figure 4A:
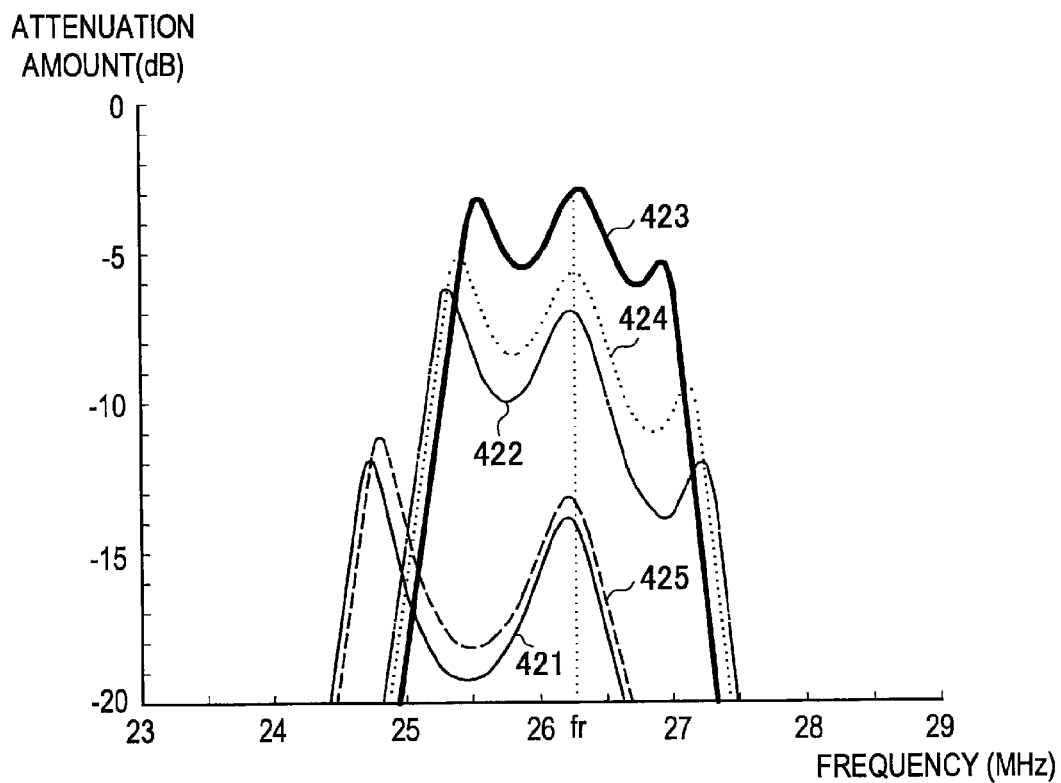
FIGS. 4A and 4B are diagrams illustrating an example of a result of measuring transmission efficiency of electrical power when the magnetic field coupling circuit 200 moves on the same axis between the resonant elements 130 and 330 according to the first embodiment of the present invention.
Figure 4B:
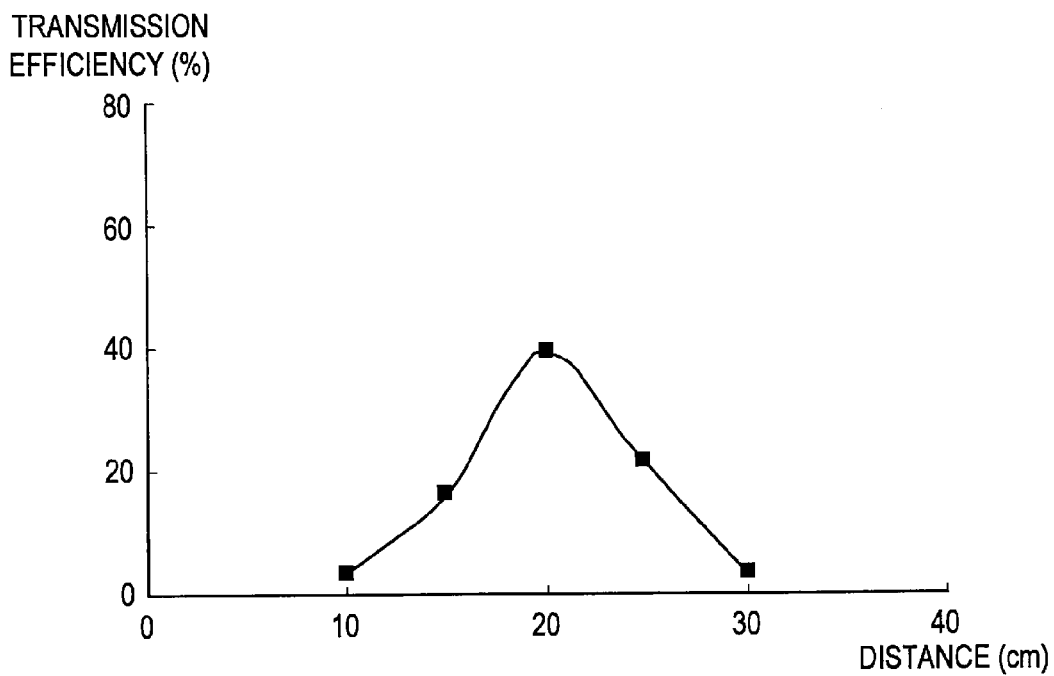

FIGS. 4A and 4B are diagrams illustrating an example of a result of measuring transmission efficiency of electrical power when the magnetic field coupling circuit 200 moves on the same axis between the resonant elements 130 and 330 according to the first embodiment of the present invention. FIG. 4A is a diagram illustrating transmission characteristics between the resonant elements 130 and 330 in the measurement system illustrated in FIG. 3. FIG. 4B is a diagram illustrating transmission efficiency of electrical power when the magnetic field coupling circuit 200 moves on the same axis between the resonant elements 130 and 330.

In FIG. 4A, transmission characteristics 421 to 425 between the resonant elements 130 and 330 are illustrated. A vertical axis represents an attenuation amount, and a horizontal axis represents a frequency. The attenuation amount is based on electrical power of the electrical signal supplied from the frequency generator 110 to the driven element 120.

The transmission characteristics 421 to 425 are transmission characteristics measured by the measurement system illustrated in FIG. 3. The transmission characteristic 421 is a transmission characteristic between the resonant element 130 and the resonant element 330 when the distance between the resonant element 130 and the magnetic field coupling circuit 200 is "10 cm." The transmission characteristic 421 represents a waveform forming two peaks near 24.7 MHz and near the resonant frequency fr. The transmission characteristic 421 is a transmission characteristic having the largest attenuation amount compared to the transmission characteristics 422 to 425.

The transmission characteristic 422 is a transmission characteristic when the distance between the resonant element 130 and the magnetic field coupling circuit 200 is "15 cm." The transmission characteristic 422 represents a shape of three peaks near 25.3 MHz, near the resonant frequency fr, and near 27.2 MHz. The transmission characteristic 422 is about 7 dB smaller in attenuation amount at the resonant frequency fr than the transmission characteristic 421.

The transmission characteristic 423 is a transmission characteristic when the distance between the resonant element 130 and the magnetic field coupling circuit 200 is "20 cm." That is, the transmission characteristic 423 is a transmission characteristic when the magnetic field coupling circuit 200 is arranged at the midpoint of the transmission distance between the resonant elements 130 and 330. The transmission characteristic 423 represents a waveform forming three peaks near 25.6 MHz, near the resonant frequency fr, and near 27.0 MHz. In this case, the attenuation amount is smallest near the resonant frequency fr. That is, by installing the magnetic field coupling circuit 200 at the midpoint of the transmission distance between the resonant elements 130 and 330, the transmission efficiency becomes highest near the resonant frequency fr.

The transmission characteristic 424 is a transmission characteristic when the distance between the resonant element 130 and the magnetic field coupling circuit 200 is "25 cm." The transmission characteristic 424 represents a shape of three peaks near 25.4 MHz, near the resonant frequency fr, and near 27.1 MHz. The transmission characteristic 424 is about 3 dB larger in attenuation amount at the resonant frequency fr than the transmission characteristic 423.

The transmission characteristic 425 is a transmission characteristic between the resonant element 130 and the resonant element 330 when the distance between the resonant element 130 and the magnetic field coupling circuit 200 is "30 cm." Similarly to the transmission characteristic 421, the transmission characteristic 425 represents a waveform forming two peaks near 24.7 MHz and near the resonant frequency fr. The transmission characteristic 425 is about 8 dB larger in attenuation amount at the resonant frequency fr than the transmission characteristic 424.

As described above, it can be understood that the transmission characteristic changes as the magnetic field coupling circuit 200 moves, on the same axial line of the coils of the resonant elements 130 and 330, between the resonant elements 130 and 330. In this case, as the magnetic field coupling circuit 200 gets closer to the position of the midpoint of the transmission distance between the resonant elements 130 and 330, the attenuation amount near the resonant frequency fr decreases. Thus, by arranging the magnetic field coupling circuit 200 at the midpoint of the transmission distance between the resonant elements 130 and 330, the attenuation amount near the resonant frequency fr can be minimized.

FIG. 4B illustrates a transmission efficiency characteristic representing a relationship between the distance between the resonant element 130 and the magnetic field coupling circuit 200 and the transmission efficiency based on the attenuation amount corresponding to the resonant frequency fr illustrated in FIG. 4A. A vertical axis represents the transmission efficiency of electrical power between the resonant elements 130 and 330, and a horizontal axis represents the distance between the resonant element 130 and the magnetic field coupling circuit 200. The transmission efficiency is based on electrical power of the electrical signal supplied from the frequency generator 110 to the driven element 120.

Here, it can be understood that the transmission efficiency is highest when the distance between the resonant element 130 and the magnetic field coupling circuit 200 is "20 cm." That is, as described above, by arranging the magnetic field coupling circuit 200 at the midpoint of the transmission distance between the resonant elements 130 and 330, the transmission efficiency of electrical power can be most improved. In this way, by arranging the resonant element 130, the magnetic field coupling circuit 200, and the resonant element 330 on the same axial line and also arranging the magnetic field coupling circuit 200 at the midpoint of the transmission distance between the resonant elements 130 and 330, the transmission efficiency can be most improved. That is, by having the resonant elements 130 and 330 to have the same magnetic field direction as the magnetic field coupling circuit 200 and arranging the magnetic field coupling circuit 200 at the midpoint of the transmission distance, the transmission efficiency can be most improved. Next, a relationship between the transmission distance and the transmission efficiency in this case will be described with reference to the next drawing.

[Improvement Example of Transmission Efficiency by Installing Magnetic Field Coupling Circuit at Midpoint Between Resonant Elements]

FIGS. 5A and 5B are diagrams illustrating a relationship between the transmission distance between the resonant elements 130 and 330 and the transmission efficiency. In the measurement system illustrated in FIG. 3, the transmission distance between the resonant elements 130 and 330 increases from "10 cm" to "80 cm," and results of measuring the attenuation amount at the resonant frequency at intervals of "10 cm" are illustrated. In this case, the magnetic field coupling circuit 200 is arranged at the midpoint of the transmission distance between the resonant elements 130 and 330 so that the coils of the magnetic field coupling circuit 200 can be coaxial with the coils of the resonant elements 130 and 330.

FIG. 5A is a diagram illustrating a relationship between the transmission distance between the resonant elements 130 and 330 and the attenuation amount. FIG. 5B is a diagram illustrating a relationship between the transmission distance between the resonant elements 130 and 330 and the transmission efficiency. A horizontal axis represents the transmission distance between the resonant elements 130 and 330.

In FIG. 5A, a transmission distance characteristic 431 is indicated by a dotted line, and a transmission distance characteristic 831 is indicated by a solid line. A vertical line represents the attenuation amount corresponding to the resonant frequency in electrical power transmission between the driven elements 120 and 320. The attenuation amount is based on electrical power of the electrical signal supplied from the frequency generator 110 to the driven element 120.

The transmission distance characteristic 431 indicated by the dotted line represents a change in attenuation amount according to a transmission distance when the magnetic field coupling circuit 200 is installed at the midpoint of the transmission distance between the resonant elements 130 and 330. In the transmission distance characteristic 431, a change in attenuation amount at a transmission distance from "about 30 cm" to about "60 cm" is small. As the transmission distance increases more than "60 cm," the attenuation amount increases.

The transmission distance characteristic 831 indicated by the solid line represents a change in attenuation amount according to a transmission distance when the magnetic field coupling circuit 200 is not installed between the resonant elements 130 and 330. In the transmission distance characteristic 831, a change in attenuation amount at the transmission distance from "10 cm" to "30 cm" is small, but as the transmission distance increases more than "30 cm," the attenuation amount increases. Thus, it can be understood that a degree of coupling by magnetic field resonance between the resonant elements 130 and 330 decreases according to the transmission distance between the resonant elements 130 and 330, and so the attenuation amount increases.

As described above, the transmission distance characteristic 431 indicated by the dotted line is suppressed to a small attenuation amount, compared to the transmission distance characteristic 831 indicated by the solid line, even if the transmission distance increases. That is, by installing the magnetic field coupling circuit 200 at the midpoint of the transmission distance between the resonant elements 130 and 330, the attenuation amount by electrical power transmission between the resonant elements 130 and 330 can be suppressed.

In FIG. 5B, a transmission distance characteristic 432 is indicated by a dotted line, and a transmission distance characteristic 832 is indicated by a solid line. A vertical axis of the transmission distance characteristics 431 and 831 illustrated in FIG. 5A represents the transmission efficiency transformed from the attenuation amount.

The transmission distance characteristic 432 indicated by the dotted line represents a change in transmission efficiency according to a transmission distance when the magnetic field coupling circuit 200 is installed at the midpoint of the transmission distance between the resonant elements 130 and 330. In the transmission distance characteristic 432, the transmission efficiency at a transmission distance from "about 30 cm" to about "50 cm" is about 40%, but as the transmission distance increases more than "50 cm," the transmission efficiency decreases.

The transmission distance characteristic 832 indicated by the solid line represents a change in transmission efficiency according to a transmission distance when the magnetic field coupling circuit 200 is not installed between the resonant elements 130 and 330. In the transmission distance characteristic 832, the amount of decrease in transmission efficiency at the transmission distance from "10 cm" to "20 cm" is small, but as the transmission distance increases more than "20 cm," the transmission efficiency decreases. If the transmission distance is larger than "50 cm," the transmission efficiency is lower than 10%.

As described above, the transmission distance characteristic 432 indicated by the dotted line is suppressed to a small amount of decrease in transmission efficiency, compared to the transmission distance characteristic 832 indicated by the solid line, even if the transmission distance increases. In the transmission distance characteristic 832, when the transmission distance becomes "40 cm," the transmission efficiency is lower than 40%. However, even if the transmission distance becomes "50 cm," the transmission efficiency of about 40% is maintained. For this reason, by installing the magnetic field coupling circuit 200 at the midpoint of the transmission distance between the resonant elements 130 and 330, the transmission efficiency between the resonant elements 130 and 330 can be improved. That is, by installing the magnetic field coupling circuit 200 at the midpoint of the transmission distance between the resonant elements 130 and 330, the transmission distance at which certain transmission efficiency can be maintained can increase. Here, an example in which one magnetic field coupling circuit 200 is installed between the resonant elements 130 and 330 has been described, but a plurality of magnetic field coupling circuits may be installed. In this case, the transmission distance between the resonant elements 130 and 330 can increase.

As described above, in the first embodiment of the present invention, by arranging the magnetic field coupling circuit 200 between the resonant elements 130 and 330 so that the magnetic field direction of the magnetic field coupling circuit 200 can be on approximately the same line as the magnetic field direction of the resonant elements 130 and 330, the transmission efficiency can be improved. Further, by installing the magnetic field coupling circuit 200 at the midpoint of the transmission distance, the transmission efficiency of electrical power can be improved except when the axis of the coil of the magnetic field coupling circuit 200 is inclined at 90° to the axis of the coils of the resonant elements 130 and 330, which is illustrated in FIG. 2. Further, a description will be made below with reference to the next drawing of a change in transmission efficiency when the magnetic field coupling circuit 200 moves in a state in which the axis of the coil of the magnetic field coupling circuit 200 is inclined at 90° to the axes of the coils of the resonant elements 130 and 330.

[Example in which Axis of Resonant Element is Perpendicular to Axis of Magnetic Field Coupling Circuit]

Figure 6:
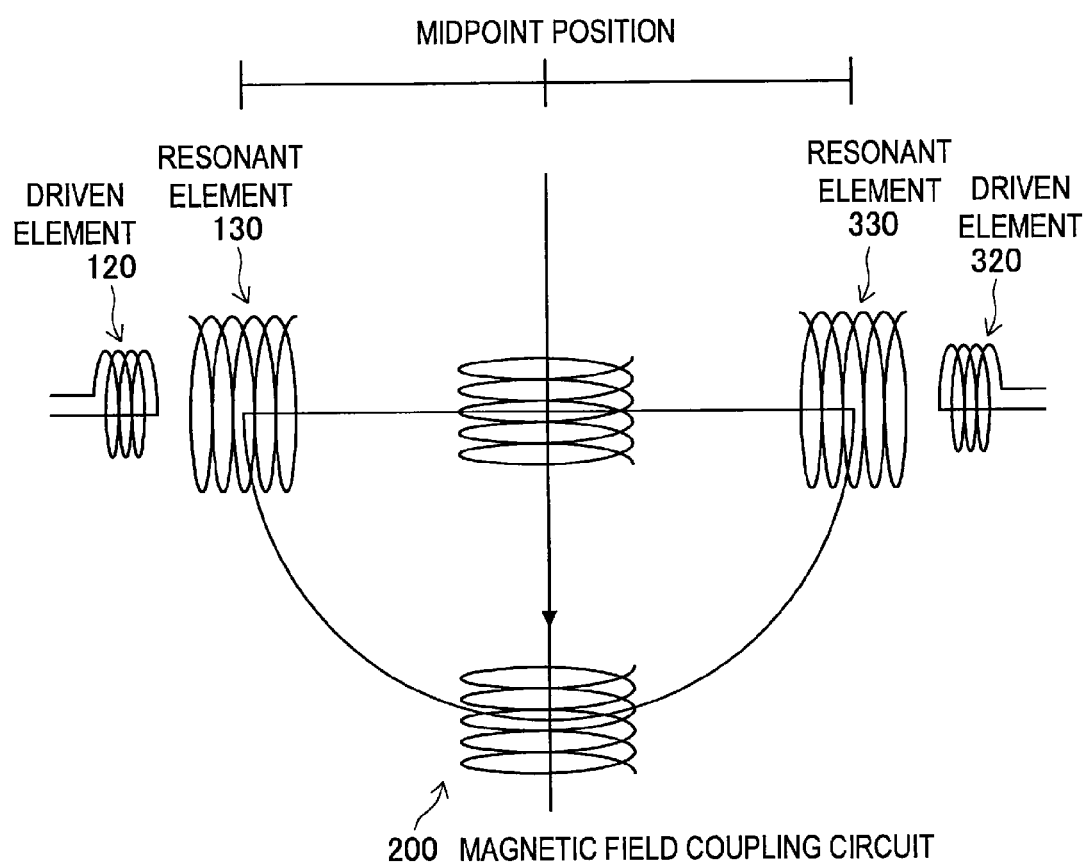
FIG. 6 is a diagram illustrating a change in transmission efficiency when an axis of a coil of the magnetic field coupling circuit 200 is perpendicular to axes of coils of the resonant elements 130 and 330.

FIG. 6 is a diagram illustrating a change in transmission efficiency when the axis of the coil of the magnetic field coupling circuit 200 is perpendicular to the axes of the coils of the resonant elements 130 and 330. Here, the driven elements 120 and 320, the resonant elements 130 and 330, and the magnetic field coupling circuit 200 are illustrated. Here, the magnetic field coupling circuit 200 moves, in the axial direction of the coil of the magnetic field coupling circuit 200, from the midpoint position of the transmission distance between the resonant elements 130 and 330.

In this case, even though the magnetic field coupling circuit 200 is installed at the midpoint position, like the transmission characteristic 414 illustrated in FIG. 2B, the transmission efficiency between the resonant elements 130 and 330 is hardly improved. However, as the magnetic field coupling circuit 200 moves from the midpoint position in the axial direction of the coil of the magnetic field coupling circuit 200, the transmission efficiency is gradually improved. When the distance of the magnetic field coupling circuit 200 from the midpoint position is larger than the distance of half the transmission distance between the resonant elements 130 and 330, the transmission efficiency decreases. As described above, by moving the magnetic field coupling circuit 200 in the magnetic field direction of the magnetic field coupling circuit 200 from the midpoint position, the transmission efficiency in electrical power transmission between the resonant elements 130 and 330 is improved in a certain range.

Here, the example in which the coils of the resonant elements 130 and 330 are arranged on the same axial line has been described. However, even if the resonant element 130, the magnetic field coupling circuit 200, and the resonant element 300 are arranged so that the axes of the coils thereof can be parallel to each other, the transmission efficiency is improved. For this reason, a description will be made below with reference to the accompanying drawings in connection with a change in transmission efficiency when the resonant element 130, the magnetic field coupling circuit 200, and the resonant element 300 are arranged so that the axes of the coils thereof can be parallel to each other.

Second Embodiment

Figure 7:
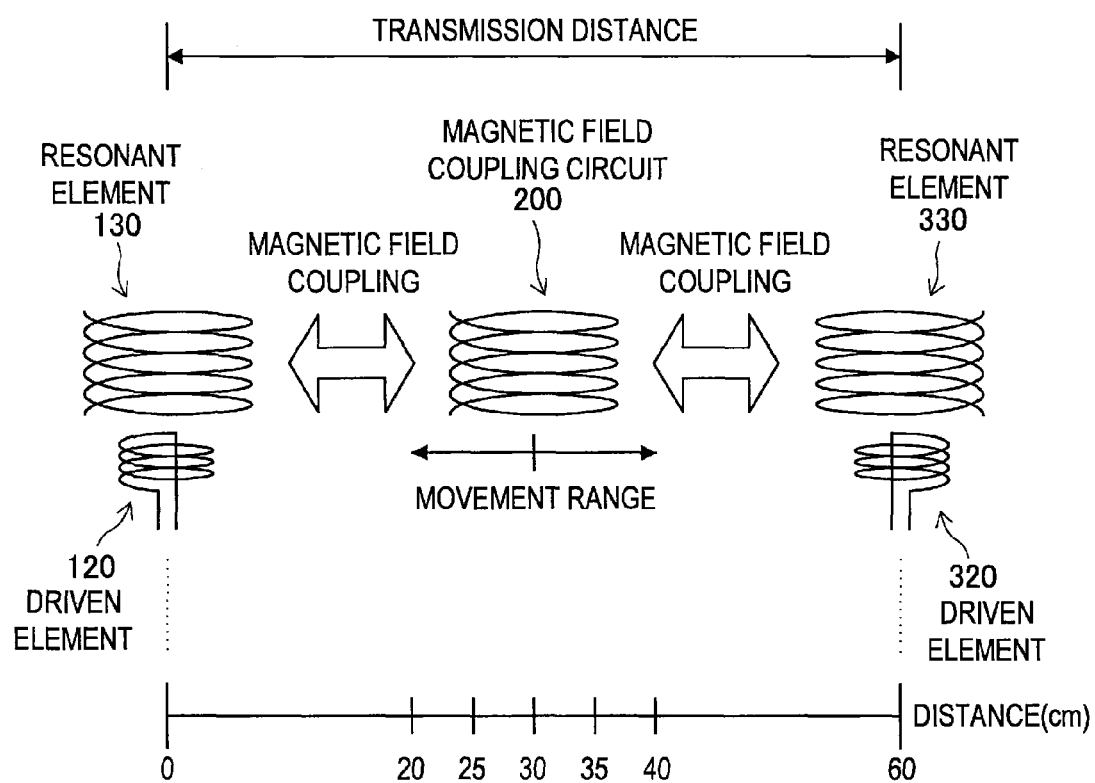
FIG. 7 is a conceptual diagram illustrating a measurement system of transmission efficiency when a magnetic field coupling circuit 200 and resonant elements 130 and 330 are arranged so that axes thereof can be parallel to each other according to a second embodiment of the present invention.

Example of Measurement Result of Transmission Efficiency when Resonant Element and Magnetic Field Coupling Circuit are Arranged to be Parallel to Each Other FIG. 7 is a conceptual diagram illustrating a measurement system of transmission efficiency when the magnetic field coupling circuit 200 and the resonant elements 130 and 330 are arranged so that the axes thereof can be parallel to each other according to a second embodiment of the present invention. Here, the driven elements 120 and 320, the resonant elements 130 and 330, and the magnetic field coupling circuit 200 are illustrated. The driven elements 120 and 320, the resonant elements 130 and 330, and the magnetic field coupling circuit 200 are the same as those illustrated in FIG. 2A, and thus a description thereof will be omitted.

In this case, the coils of the resonant element 130, the magnetic field coupling circuit 200, and the resonant element 330 are arranged so that the axes of the coils can be parallel to each other. That is, the resonant element 130, the magnetic field coupling circuit 200, and the resonant element 330 are arranged so that magnetic field directions of magnetic fields generated from the resonant element 130, the magnetic field coupling circuit 200, and the resonant element 330 can be parallel to each other. The transmission distance between the resonant elements 130 and 330 is "60 cm."

In this measurement system, the magnetic field coupling circuit 200 moves between the resonant elements 130 and 330, and transmission characteristics when the distance between the resonant element 130 and the magnetic field coupling circuit 200 is "20 cm," "25 cm," "30 cm," "35 cm," and "40 cm" are measured. At this time, the coil of the magnetic field coupling circuit 200 is set to be parallel to the axes of the coils of the resonant elements 130 and 330. The measurement results in this case are illustrated in the next drawing.

Figure 8A:
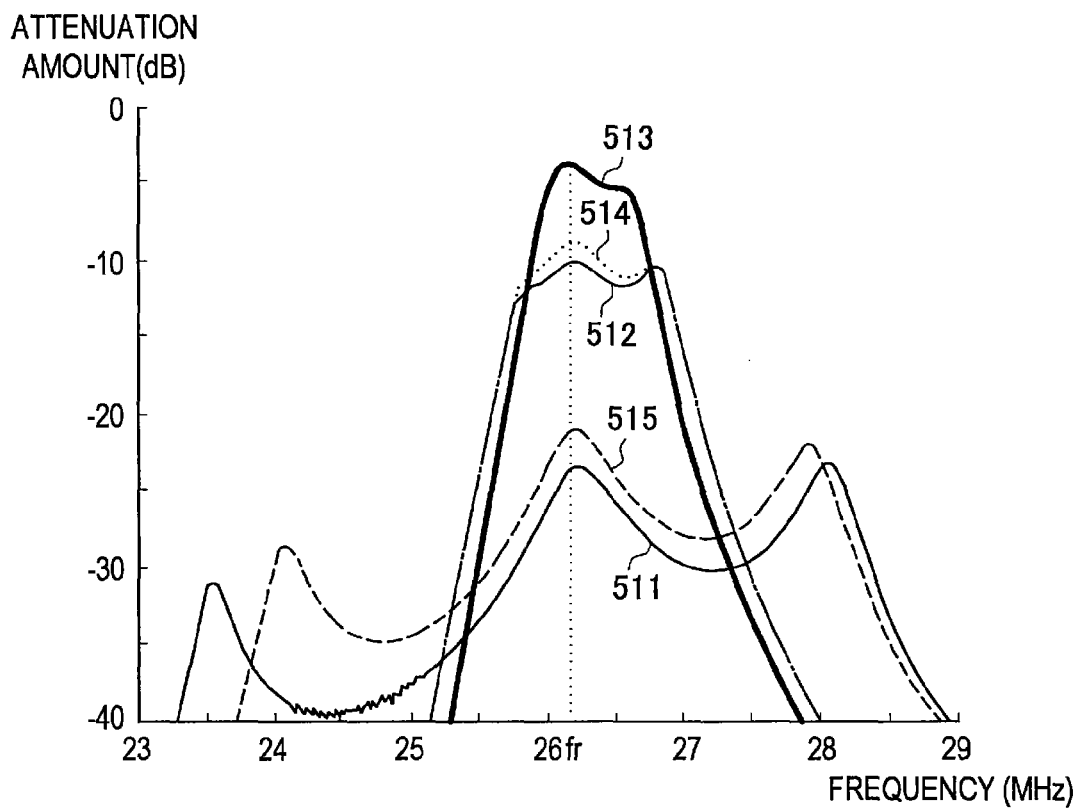
FIGS. 8A and 8B are diagrams illustrating an example of a result of measuring transmission efficiency of electrical power when the magnetic field coupling circuit 200 moves between the resonant elements 130 and 330 according to the second embodiment of the present invention.
Figure 8B:
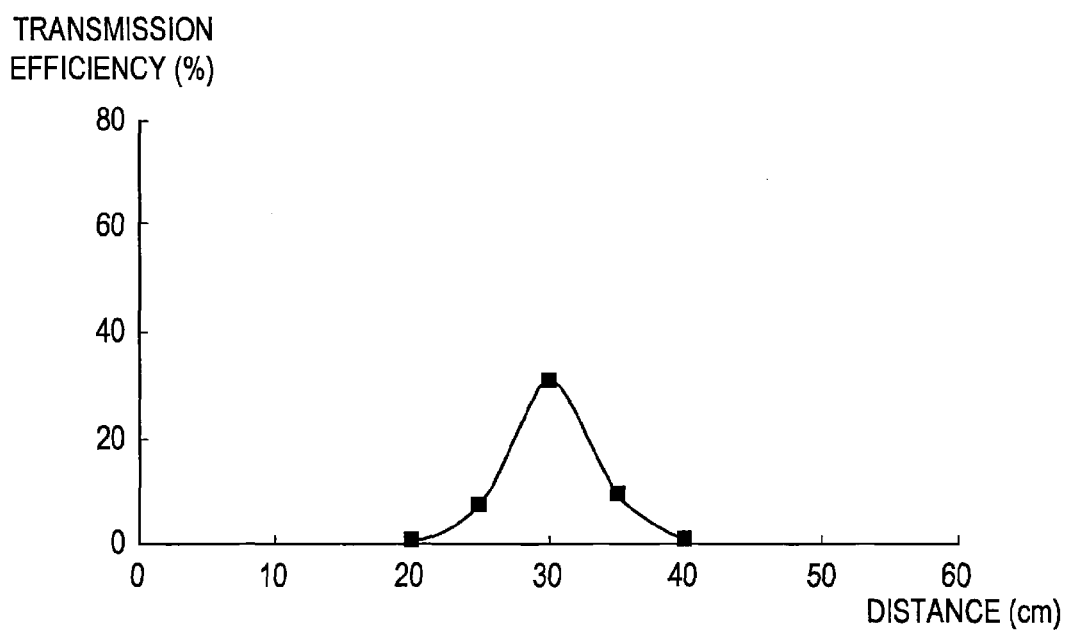

FIGS. 8A and 8B are diagrams illustrating an example of a result of measuring transmission efficiency of electrical power when the magnetic field coupling circuit 200 moves between the resonant elements 130 and 330 according to the second embodiment of the present invention. FIG. 8A is a diagram illustrating transmission characteristics between the resonant elements 130 and 330 in the measurement system illustrated in FIG. 7. FIG. 8B is a diagram illustrating transmission efficiency of electrical power when the magnetic field coupling circuit 200 moves between the resonant elements 130 and 330.

In FIG. 8A, transmission characteristics 511 to 515 between the resonant elements 130 and 330 are illustrated. A vertical axis represents an attenuation amount in electrical power transmission between the driven elements 120 and 320, and a horizontal axis represents a frequency. The attenuation amount is based on electrical power of the electrical signal supplied from the frequency generator 110 to the driven element 120.

The transmission characteristics 511 to 515 are transmission characteristics measured by the measurement system illustrated in FIG. 7. The transmission characteristic 511 is a transmission characteristic between the resonant element 130 and the resonant element 330 when the distance between the resonant element 130 and the magnetic field coupling circuit 200 is "20 cm." The transmission characteristic 511 represents a waveform forming three peaks near 23.6 MHz, near the resonant frequency fr, and near 28.0 MHz. The transmission characteristic 511 is a transmission characteristic having the largest attenuation amount compared to the transmission characteristics 512 to 515.

The transmission characteristic 512 is a transmission characteristic when the distance between the resonant element 130 and the magnetic field coupling circuit 200 is "25 cm." The transmission characteristic 512 represents a shape of three peaks near the resonant frequency fr and near 26.7 MHz. The transmission characteristic 512 is about 14 dB smaller in attenuation amount at the resonant frequency fr than the transmission characteristic 511. That is, the transmission characteristic 512 has greatly improved transmission efficiency compared to the transmission characteristic 511.

The transmission characteristic 513 is a transmission characteristic when the distance between the resonant element 130 and the magnetic field coupling circuit 200 is "30 cm." That is, the transmission characteristic 513 is a transmission characteristic when the magnetic field coupling circuit 200 is arranged at the midpoint of the transmission distance between the resonant elements 130 and 330. The transmission characteristic 513 represents a waveform forming a peak near the resonant frequency fr. In this case, the attenuation amount is smallest near the resonant frequency fr. That is, by installing the magnetic field coupling circuit 200 at the midpoint of the transmission distance between the resonant elements 130 and 330, the transmission efficiency becomes highest near the resonant frequency fr.

The transmission characteristic 514 is a transmission characteristic when the distance between the resonant element 130 and the magnetic field coupling circuit 200 is "35 cm." Similarly to the transmission characteristic 512, the transmission characteristic 514 represents a shape of two peaks near the resonant frequency fr and near 26.7 MHz. The transmission characteristic 514 is about 5 dB larger in attenuation amount at the resonant frequency fr than the transmission characteristic 513.

The transmission characteristic 515 is a transmission characteristic between the resonant element 130 and the resonant element 330 when the distance between the resonant element 130 and the magnetic field coupling circuit 200 is "40 cm." The transmission characteristic 515 represents a waveform forming three peaks near 24.1 MHz, near the resonant frequency fr, and 27.9 MHz. The transmission characteristic 515 is about 15 dB larger in attenuation amount at the resonant frequency fr than the transmission characteristic 514.

As described above, it can be understood that the transmission characteristic changes as the magnetic field coupling circuit 200 moves between the resonant elements 130 and 330 in a state in which the resonant element 130, the magnetic field coupling circuit 200, and the resonant element 330 are arranged so that the axes of the coils thereof can be parallel to each other. In this case, as the magnetic field coupling circuit 200 gets closer to the position of the midpoint of the transmission distance between the resonant elements 130 and 330, the attenuation amount near the resonant frequency fr decreases. Thus, by arranging the magnetic field coupling circuit 200 at the midpoint of the transmission distance between the resonant elements 130 and 330, the attenuation amount near the resonant frequency fr can be minimized.

FIG. 8B illustrates a transmission efficiency characteristic representing a relationship between the distance between the resonant element 130 and the magnetic field coupling circuit 200 and the transmission efficiency based on the attenuation amount corresponding to the resonant frequency fr illustrated in FIG. 8A. A vertical axis represents the transmission efficiency of electrical power at the resonant frequency between the resonant elements 130 and 330, and a horizontal axis represents the distance between the resonant element 130 and the magnetic field coupling circuit 200. The transmission efficiency is based on electrical power of the electrical signal supplied from the frequency generator 110 to the driven element 120.

Here, it can be understood that the transmission efficiency is highest when the distance between the resonant element 130 and the magnetic field coupling circuit 200 is "30 cm." That is, as described above, by arranging the magnetic field coupling circuit 200 at the midpoint of the transmission distance between the resonant elements 130 and 330, the transmission efficiency of electrical power can be most improved. Thus, by arranging the resonant element 130, the magnetic field coupling circuit 200, and the resonant element 330 so that the axes of the coils thereof can be parallel to each other and also arranging the magnetic field coupling circuit 200 at the midpoint of the transmission distance between the resonant elements 130 and 330, the transmission efficiency can be most improved. That is, by having the resonant elements 130 and 330 to have the same magnetic field direction as the magnetic field coupling circuit 200 and arranging the magnetic field coupling circuit 200 at the midpoint of the transmission distance, the transmission efficiency can be most improved.

As described above, according to the second embodiment, by arranging the magnetic field coupling circuit 200 between the resonant elements 130 and 330 so that the magnetic field can be generated approximately in parallel to the magnetic field direction of the resonant elements 130 and 330, the transmission efficiency can be improved. Further, in this case, by installing the magnetic field coupling circuit 200 at the midpoint of the transmission distance between the resonant elements 130 and 330, the transmission efficiency in electrical power transmission between the resonant elements 130 and 330 can be further improved. For this reason, the transmission distance between the resonant elements 130 and 330 at which certain transmission efficiency can be maintained can increase.

Further, the example in which magnetic field coupling is caused between the resonant elements 130 and 330 by installing the magnetic field coupling circuit 200 between the resonant elements 130 and 330 has been described, but the magnetic field coupling circuit 200 may be arranged as described below.

3. Third Embodiment

Figure 9:
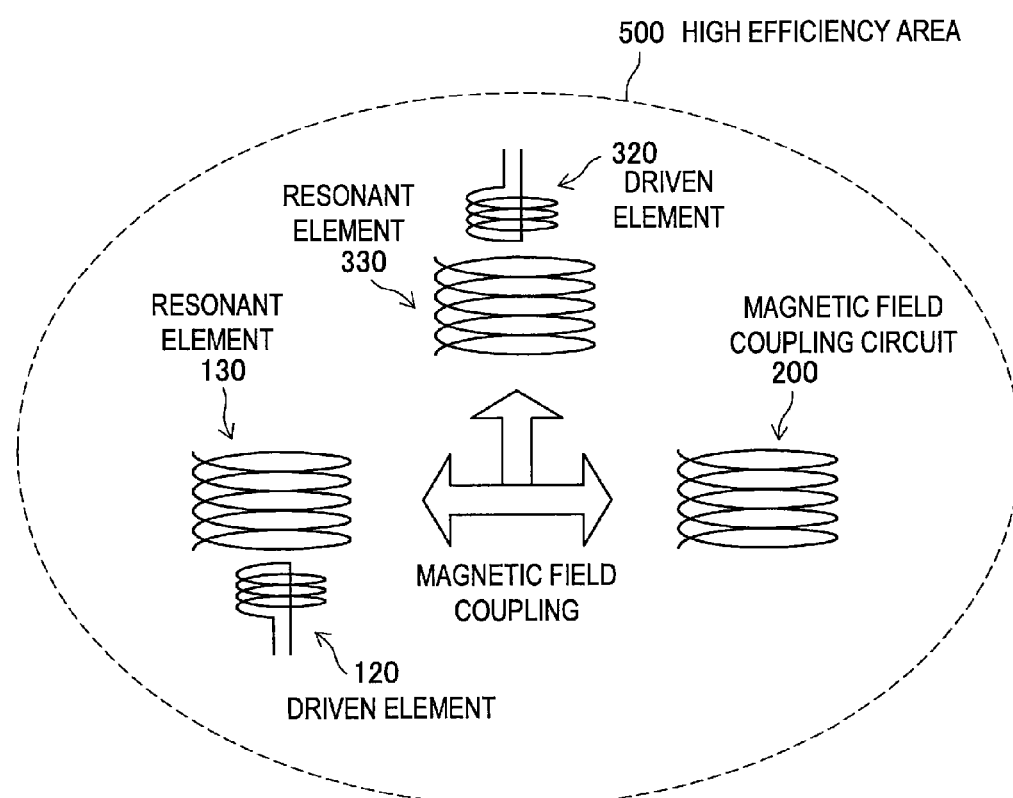
FIG. 9 is a diagram illustrating an arrangement example of a resonant element 130, a magnetic field coupling circuit 200, and a resonant element 330 according to a third embodiment of the present invention.

Example in which Magnetic Field Coupling Circuit is Arranged Around Resonant Element FIG. 9 is a diagram illustrating an arrangement example of the resonant element 130, the magnetic field coupling circuit 200, and the resonant element 330 according to a third embodiment of the present invention. Here, the driven elements 120 and 320, the resonant elements 130 and 330, and the magnetic field coupling circuit 200 are illustrated. The driven elements 120 and 320, the resonant elements 130 and 330, and the magnetic field coupling circuit 200 are the same as those illustrated in FIG. 1 and are denoted by the same reference numerals, and thus a description thereof will be omitted.

In this case, directions of the coils of the resonant element 130, the magnetic field coupling circuit 200, and the resonant element 330 are set so that the axes of the coils of the resonant element 130, the magnetic field coupling circuit 200, and the resonant element 330 can be parallel to each other. The resonant element 130 and the magnetic field coupling circuit 200 are arranged at a specific interval in a direction perpendicular to the axes of the coils, and the resonant element 330 is arranged in the axial direction of the coils at a predetermined interval from the midpoint of the distance between the resonant element 130 and the magnetic field coupling circuit 200. The power receiving device 300 receives electrical power from the power supply device 100 by magnetic field resonance with the resonant element 130 or the magnetic field coupling circuit 200.

Though the magnetic field coupling circuit 200 is arranged around the resonant elements 130 and 330, since coupling by magnetic field resonance occurs between the resonant elements 130 and 330 and the magnetic field coupling circuit 200, the transmission efficiency between the resonant elements 130 and 330 can be improved. Thus, since a high efficiency area 500 in which high transmission efficiency of electrical power is obtained broadens, the resonant element 330 can receive electrical power from the resonant element 130 at a constant rate in the high efficiency area 500.

As described above, according to the embodiments of the present invention, by installing the magnetic field coupling circuit 200, the transmission efficiency in electrical power transmission between the resonant elements 130 and 330 can be improved. Application examples of the embodiments of the present invention will be simply described below with reference to the accompanying drawings.

4. Application Example of First to Third Embodiments

Application Example to Mouse Pad and Mouse

Figure 10:
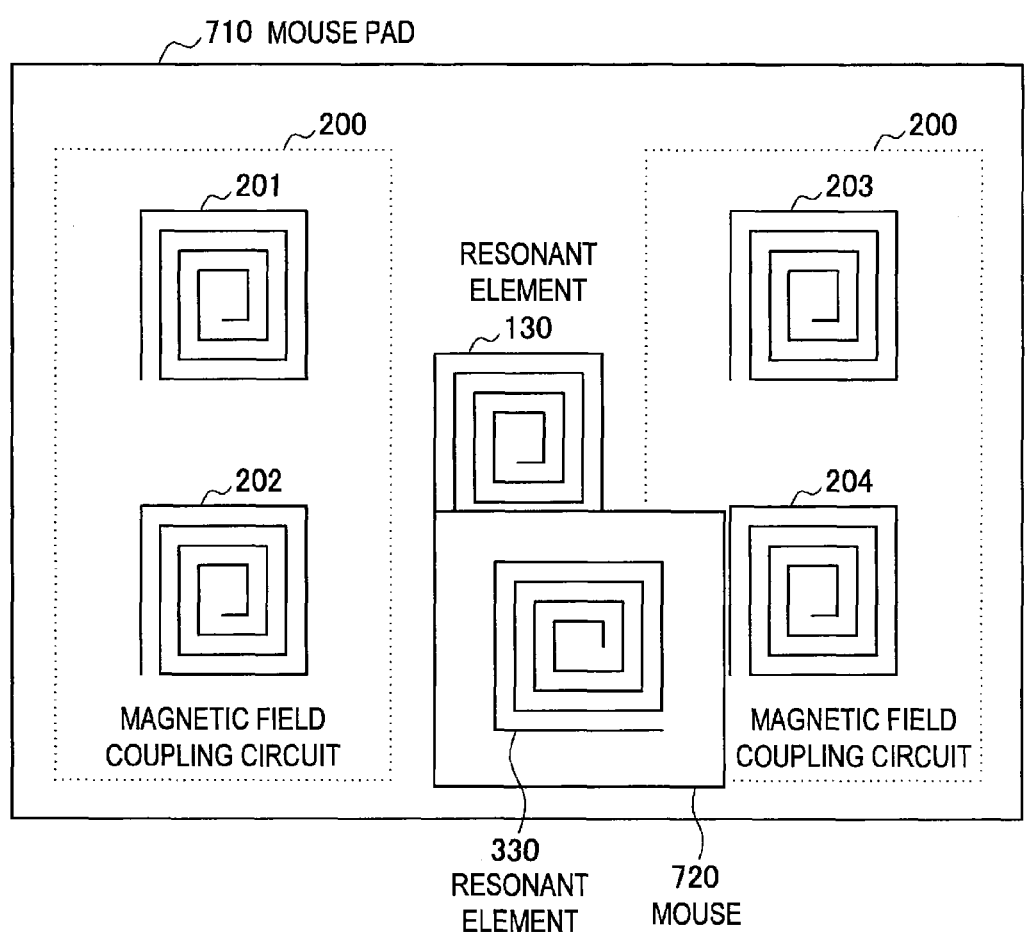
FIG. 10 is a block diagram illustrating a configuration example of a mouse pad 710 and a mouse 720 when the first to third embodiments of the present invention are applied to the mouse pad 710 and the mouse 720.

FIG. 10 is a block diagram illustrating a configuration example of a mouse pad 710 and a mouse 720 when the first to third embodiments of the present invention are applied to the mouse pad 710 and the mouse 720. Here, the mouse pad 710 that supplies electrical power and the mouse 720 that receives electrical power from the mouse pad 710 are illustrated. In this configuration, in the mouse 720 moved on the mouse pad 710 by a human hand, movement information representing the amount of displacement of the mouse 720 is generated, and the generated movement information is transmitted to the mouse pad 710. Then, it is assumed that the movement information is received by the mouse pad 710. In this application example, a description will be made focusing on an arrangement of the resonant elements 130 and 330 and the magnetic field coupling circuit 200, and the remaining configuration will not be illustrated in the drawing.

The mouse pad 710 includes the resonant element 130 and the magnetic field coupling circuit 200. The mouse pad 710 corresponds to the power supply device 100 illustrated in FIG. 1. The mouse 720 includes the resonant element 330. The mouse 720 corresponds to the power receiving device 300 illustrated in FIG. 1. Although not shown, the mouse pad 710 includes the frequency generator 110 and the driven element 120, which are illustrated in FIG. 1. Further, the mouse 720 includes the rectifier circuit 310, the driven element 220 and the load circuit 340, which are illustrated in FIG. 1. Here, the load circuit 340 measures the amount of displacement which is the movement distance and direction of the mouse 720 and generates the measured result as the movement information.

The resonant element 130 is an element having inductance and capacitance as described above with reference to FIG. 1. The resonant element 130 is implemented by a spiral coil. The resonant element 130 causes coupling by magnetic field resonance with the magnetic field coupling circuit 200 or the resonant element 330.

The magnetic field coupling circuit 200 includes four resonant elements 201 to 204. The resonant elements 201 to 204 are elements having inductance and capacitance and are implemented by a spiral coil. The resonant elements 201 to 204 are on the same plane of the coil of the resonant element 130 and are arranged on diagonal lines of the resonant element 130, respectively. The resonant elements 201 to 204 become coupled by magnetic field resonance with the resonant element 130 or the 330. The resonant elements 201 to 204 have approximately the same resonant frequency as the resonant elements 130 and 330. The magnetic field coupling circuit 200 is an example of the magnetic field coupling circuit 200 specified in the scope of claims. The resonant elements 201 to 204 are an example of a plurality of resonant elements specified in the scope of claims.

The resonant element 330 is a spiral coil having inductance and capacitance as described above with reference to FIG. 1. The resonant element 330 supplies the mouse 720 with electrical power from the mouse pad 710 by coupling by magnetic field resonance with the resonant element 130 or the magnetic field coupling circuit 200.

As described above, by installing the resonant elements 201 to 204 around the resonant element 130 in the mouse pad 710, an area in which the resonant element 330 can receive electrical power can broaden. The mouse pad 710 is an example of an electrical power output device specified in the scope of claims. Here, the example in which the first to third embodiments of the present invention are applied to the mouse pad 710 and the mouse 720 has been described, but the first to third embodiments of the present invention may be applied to a desk and a notebook computer. In this case, the resonant element 130 and a plurality of resonant elements in the magnetic field coupling circuit 200 are installed inside the desk, and the resonant element 330 is installed inside the notebook computer. Thus, the notebook computer can receive electrical power supplied from the desk by magnetic field coupling between the resonant element 130 and the magnetic field coupling circuit 200 in the desk and the resonant element 330 in the notebook computer.

Next, a description will be made below in connection with an example in which the embodiments of the present invention are applied when the distance between the resonant elements 130 and 330 is lengthy due to a restriction in a manufacturing process of a semiconductor device.

Figure 11:
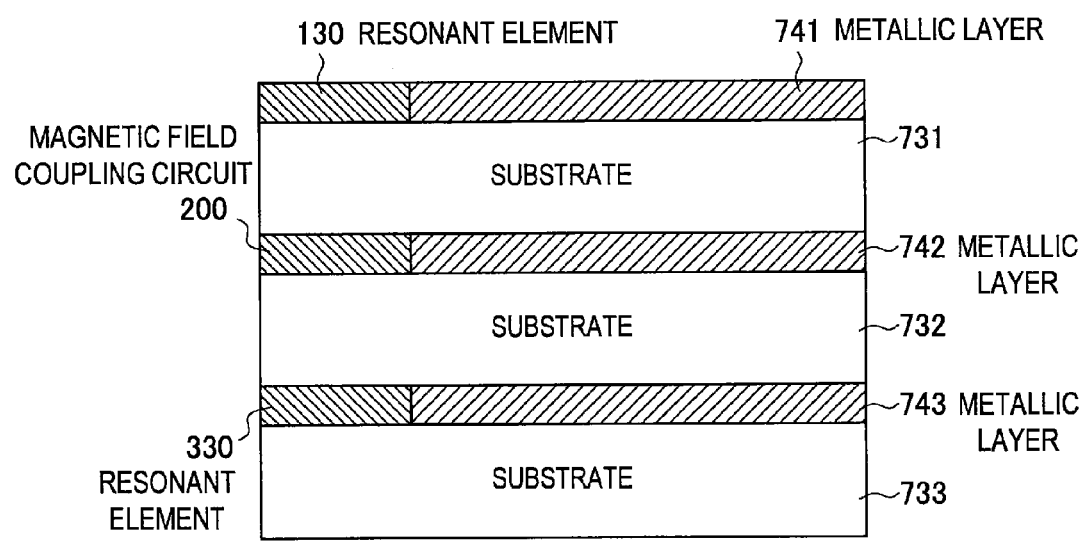
FIG. 11 is a cross-sectional view illustrating an example of a stacking structure of a semiconductor device when the first embodiment of the present invention is applied to the semiconductor device.

[Example when there is Manufacturing Restriction]
FIG. 11 is a cross-sectional view illustrating an example of a stacking structure of a semiconductor device when the first embodiment of the present invention is applied to the semiconductor device. Here, the resonant elements 130 and 330, the magnetic field coupling circuit 200, substrates 731 to 733, and metallic layers 741 to 743 are illustrated. Here, it is assumed that the resonant element 130 and the metallic layer 741 are formed on the substrate 731 in the upper portion, the metallic layer 742 is formed on the substrate 732 in the middle portion, and the resonant element 330 and the metallic layer 743 are formed on the substrate 733 in the lower portion. In this structure, the resonant element 330 receives electrical power from the resonant element 130 and supplies the metallic layer 743 with the received electrical power.

In this case, by forming the magnetic field coupling circuit 200 on the metallic layer 742 between the resonant elements 130 and 330, the electrical power transmission efficiency between the resonant elements 130 and 330 can be improved.

Figure 12:
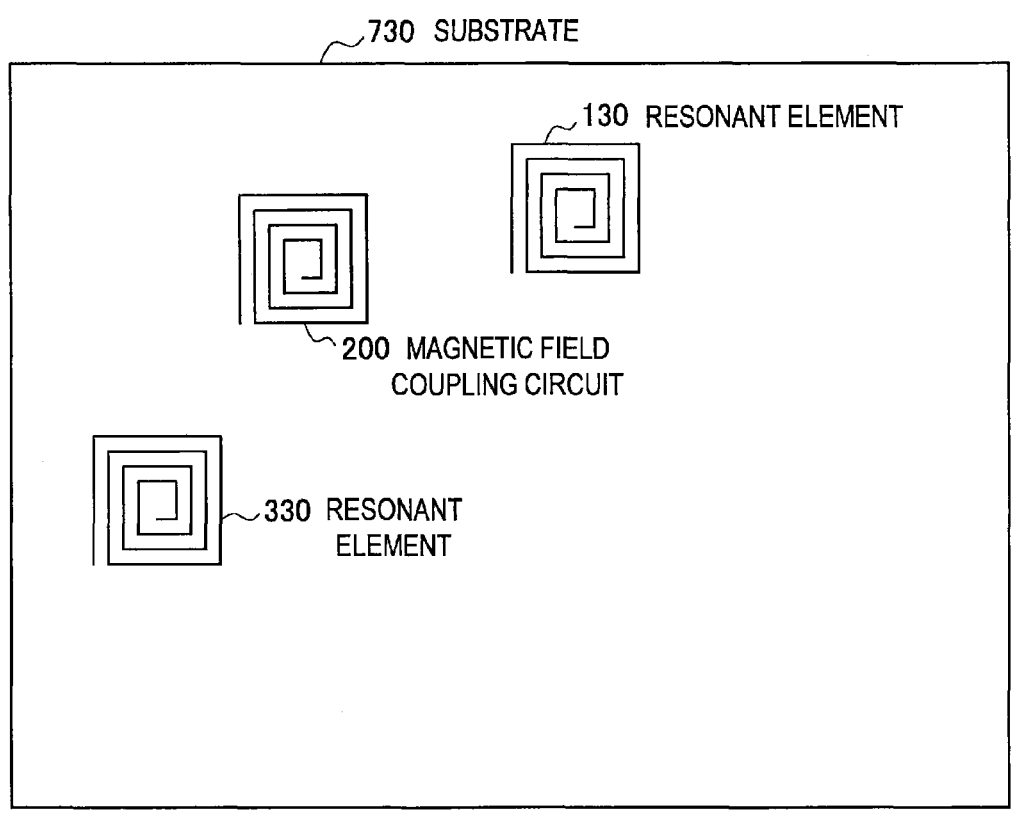
FIG. 12 is a plan view illustrating an example of the layout of a semiconductor device when the second embodiment of the present invention is applied to the semiconductor device.

FIG. 12 is a plan view illustrating an example of the layout of a semiconductor device when the second embodiment of the present invention is applied to the semiconductor device. Here, a substrate 730, the resonant elements 130 and 330, and the magnetic field coupling circuit 200 are illustrated. Here, it is assumed that the resonant elements 130 and 330 are formed, on the substrate 730, apart from each other at a certain interval due to the manufacturing restriction.

In this case, by forming the magnetic field coupling circuit 200 at the midpoint between the resonant elements 130 and 330, the electrical power transmission efficiency between the resonant elements 130 and 330 can be improved.

The embodiments of the present invention are examples for realizing the present invention and have a correspondence relation with each of invention specifying items in the scope of claims as described above. However, the present invention is not limited to the above embodiments, and various modifications can be made in a range that does not depart from the gist of the present invention.

For example, the present invention can be widely applied to an electrical power transmission system, an electrical power output device, or the like which supply electrical power using magnetic field resonance.

REFERENCE SIGNS LIST

100 Power supply device
110 Frequency generator
120, 320 Driven element
130, 201 to 204, 330 Resonant element
200 Magnetic field coupling circuit
300 Power receiving device
310 Rectifier circuit
340 Load circuit
710 Mouse pad
720 Mouse

The invention claimed is:

1. An electrical power transmission system, comprising:
a power supply device including (a) a first resonant element having inductance and capacitance and that resonates at a first resonant frequency determined by the inductance and capacitance, (b) a frequency generator that generates an electrical power signal having a frequency that is the same as or approximately the same as the first resonant frequency determined by the inductance and the capacitance of the first resonant element, and (c) a first driven element that transmits the electrical power signal to the first resonant element by magnetic field resonance coupling;
a magnetic field coupling circuit that becomes coupled by magnetic field resonance coupling with the first resonant element and receives electrical power from the first resonant element by the magnetic field resonance coupling; and
a power receiving device including (a) a second resonant element that includes an inductance and a capacitance and that resonates at a second resonant frequency determined by the inductance and capacitance, the second resonant element receiving electrical power from the power supply device via the magnetic field coupling circuit by magnetic field resonance coupling with the magnetic field coupling circuit, and (b) a second driven element that receives the electrical power signal from the second resonant element by magnetic field resonance coupling,
wherein,
the first and second resonant elements have parallel magnetic fields,
the magnetic field coupling circuit has a magnetic field that is orthogonal to the magnetic fields of the first and second resonant elements,
the magnetic field coupling circuit is located midway between the first and second resonant elements, and
at least the first resonant element and the magnetic field coupling circuit are located within a same device.

2. The electrical power transmission system according to claim 1, wherein the magnetic field coupling circuit has a resonant frequency that is approximately the same as the resonant frequency of the first resonant element.

3. The electrical power transmission system according to claim 1, wherein the magnetic field coupling circuit includes a plurality of resonant elements each having inductance and capacitance.

4. The electrical power transmission system of claim 1, wherein the magnetic field coupling circuit has a resonant frequency that is the same as the resonant frequency of the first resonant element.

5. The electrical power transmission system of claim 1, wherein each of the magnetic field coupling circuit and the second resonant element has a resonant frequency that is approximately the same as the resonant frequency of the first resonant element.

6. The electrical power transmission system of claim 1, wherein each of the magnetic field coupling circuit and the second resonant element has a resonant frequency that is the same as the resonant frequency of the first resonant element.

7. The electrical power transmission system of claim 1, wherein the first and second resonators are separated by no more than a distance of 10 cm to 80 cm.

8. The electrical power transmission system of claim 7, wherein each of the first and second resonators and the magnetic field coupling circuit comprises a coil with a radius of 10 cm.

9. The electrical power transmission system of claim 1, wherein each of the first and second resonators and the magnetic field coupling circuit comprises a coil with a radius of 10 cm.

* * * * *